United States Patent
Berninger et al.

(10) Patent No.: US 6,223,618 B1
(45) Date of Patent: May 1, 2001

(54) DEVICE FOR DRIVING A ROBOT HAND

(75) Inventors: Alwin Berninger, Augsburg; Wolfgang Bohlken, Friedberg, both of (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 09/292,618

(22) Filed: Apr. 15, 1999

(30) Foreign Application Priority Data

Apr. 17, 1998 (DE) ............................................. 198 17 606

(51) Int. Cl.⁷ ..................................................... B25J 17/00

(52) U.S. Cl. .......................................... 74/490.06; 901/29

(58) Field of Search ........................... 74/490.01, 490.02, 74/490.03, 490.05, 490.06; 901/23, 29

(56) References Cited

U.S. PATENT DOCUMENTS

| 4,047,448 | | 9/1977 | Pardo. | |
|---|---|---|---|---|
| 4,300,362 | * | 11/1981 | Lande et al. | 64/17 R |
| 4,548,097 | | 10/1985 | Zimmer. | |
| 4,907,937 | * | 3/1990 | Milenkovic | 414/735 |
| 5,305,652 | * | 4/1994 | Zimmer | 74/479 B |
| 5,699,695 | * | 12/1997 | Canfield et al. | 74/490.06 |

\* cited by examiner

*Primary Examiner*—David Fenstermacher
(74) *Attorney, Agent, or Firm*—Paul Vincent

(57) ABSTRACT

In order to simplify assembly of a robot hand to a robot arm, the invention is a device for driving a robot hand on a robot arm having a plurality of cardan shafts with which the cardan shafts are borne at their ends distant from the hand on a bearing plate which can be displaced relative to the robot arm.

4 Claims, 3 Drawing Sheets

DEVICE FOR DRIVING A ROBOT HAND

This application claims Paris Convention priority of DE 198 17 606.6 filed Apr. 17, 1998 the complete disclosure of which is hereby incorporated by reference.

BACKGROUND OF THE INVENTION

The invention concerns a device for driving a robot hand of a robot arm having a plurality of cardan shafts.

Cardan shafts, driven by electrical motors, are disposed in an axially secure fashion on a robot arm provided for bearing a robot hand. The cardan shafts drive the robot hand. When mounting the robot hand or its gear head, motors are often damaged due to the strong axial forces acting on the shaft ends of the cardan shafts when the ends of the hand drive shafts do not slide with sufficient ease into the bushings of the cardan shafts. This is particularly the case for shaft couplings having gear teeth. Moreover, the assembly is difficult and complicated, since the gear head of the robot hand or its housing must be mounted to the robot arm and, at the same time, the shaft couplings between the gear head and the cardan shafts must be brought into mutual engagement.

It is therefore the underlying purpose of the invention to simplify assembly of a robot hand and its gear head to a robot arm while simultaneously preventing the danger of damage to the motors.

SUMMARY OF THE INVENTION

This above mentioned purpose is achieved in accordance with the invention with a device of the above mentioned kind in that the cardan shafts are borne at their ends distant from the hand on a bearing plate which can be displaced relative to the robot arm.

The disposal of the bearing plate distant from the hand on the robot arm in an axially displaceable fashion allows same to be disengaged prior to assembly of the gear head of the robot hand (after loosening the mounting bolts). It can be pushed somewhat away from the robot arm, wherein it carries along with it the shaft couplings axially mounted thereto. The required displacement is thereby somewhat larger than the engagement length of the shaft couplings.

The gear head or its housing can then be mounted to the robot arm. The bearing plate having the cardan shafts is then once more coupled in with the shaft couplings being successively engaged. The bearing plate is then bolted to the robot arm. The separation of the connection between the gear housing and the robot arm from the shaft coupling facilitates a simpler assembly with which damaging axial forces acting on the motors and an associated damage to the motors during successive engagement of the couplings is also avoided.

Preferred embodiments of the invention are distinguished in that the bearing plate is borne in a displaceable manner using guide pins, wherein the bearing plate can be preferentially mounted to the robot arm in the operational position using bolts. A further improvement provides that the motors are mounted to the bearing plate for operation of the cardan shafts.

Further advantages and features of the invention can be extracted from the claims and the subsequent description in which an embodiment of the invention is described in detail with reference to the drawing.

DESCRIPTION OF THE PREFERRED EMBODIMENT

Figure 1:
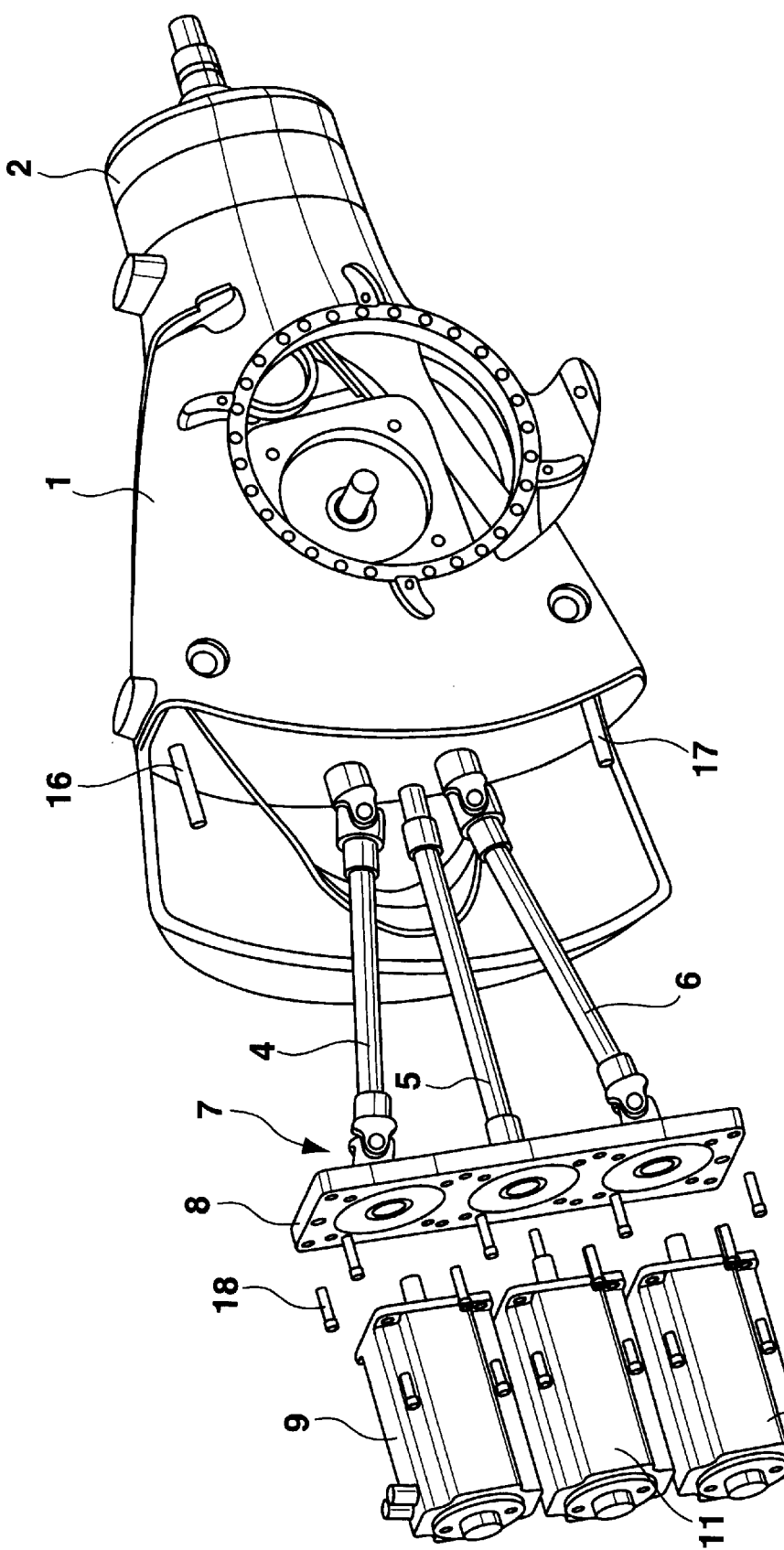
FIG. 1 shows a perspective view of a device in accordance with the invention for driving a robot hand with the elements on the motor side in exploded view.

The device in accordance with the invention for driving a robot hand on a robot arm comprises a robot arm 1 bearing a gear head 2 for a robot hand. The gear head 2 is driven by three cardan shafts 4, 5, 6 penetrating through the robot arm 1, the ends (near 7) of which distant the hand and the drive head being borne on a bearing plate 8 distant from the hand. The cardan shafts 4, 5 and 6 are driven by electrical motors 9, 11, 12 which can be mounted to the bearing plate 8.

Figure 2:
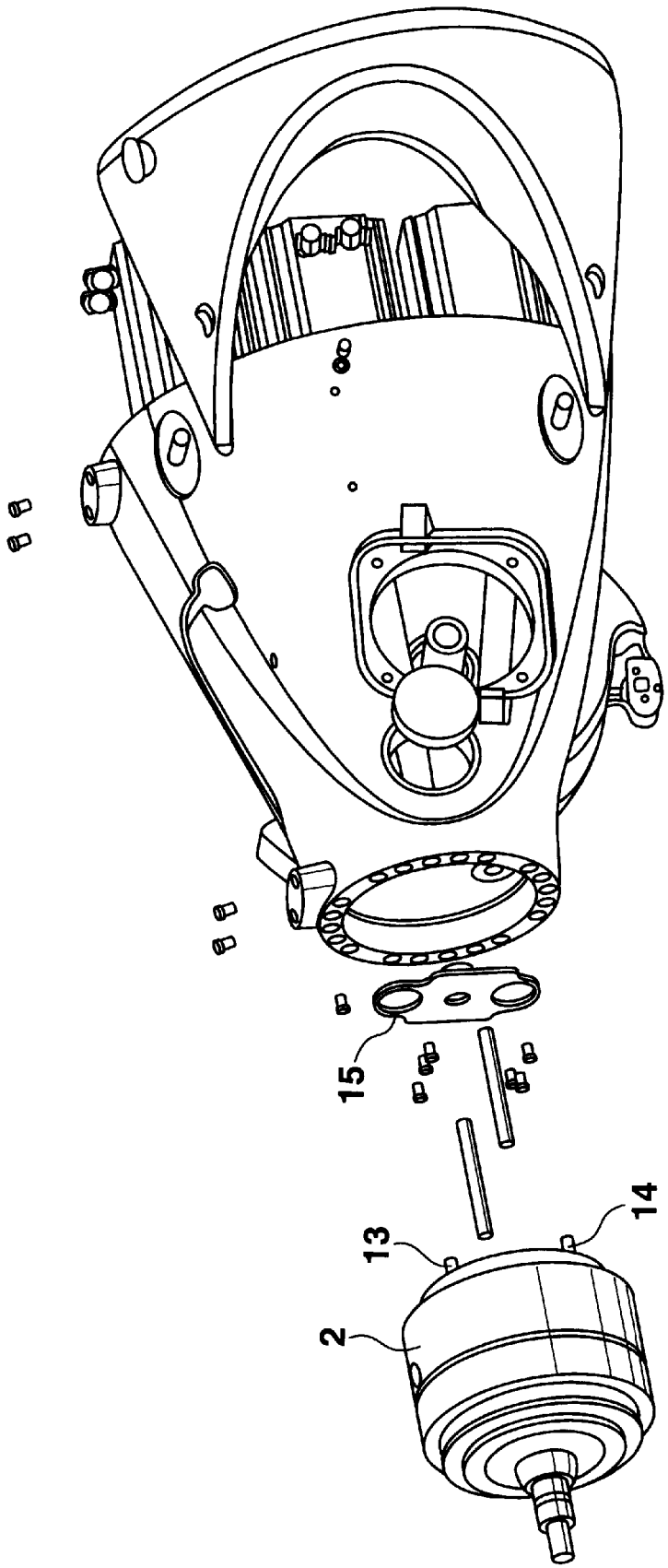
FIG. 2 shows a perspective representation similar to that of FIG. 1 with elements distant from the motor in exploded view.

The drive transmission from the cardan shafts 4–6 to the gearing of the gear head 2 is effected via shaft couplings formed on the ends of the cardan shafts 4–6 proximate the gear head and, at the gear head 2 via coupling pins 13 (with only the two outermost ones of which being visible in FIG. 2) and a recess 14. The shaft couplings can be configured as gear teeth structures. The ends of the cardan shafts 4–6 proximate the gear head are thereby borne in a displaceable fashion in a bearing plate 15 firmly mounted to the end of the robot arm 1 proximate the gear head.

The bearing plate 8 at the motor side, to which those ends of the cardan shafts 4–6 facing same are borne in an axially secure fashion, is borne by guide pins 16, 17 provided on the robot arm 1 for displacement along the axial direction of the middle cardan shaft 5 and therefore along the main direction of extension of the cardan shafts 4–6. The bearing plate 8 can be mounted in an axially secure fashion to the robot arm 1 using mounting bolts 18.

Figure 3:
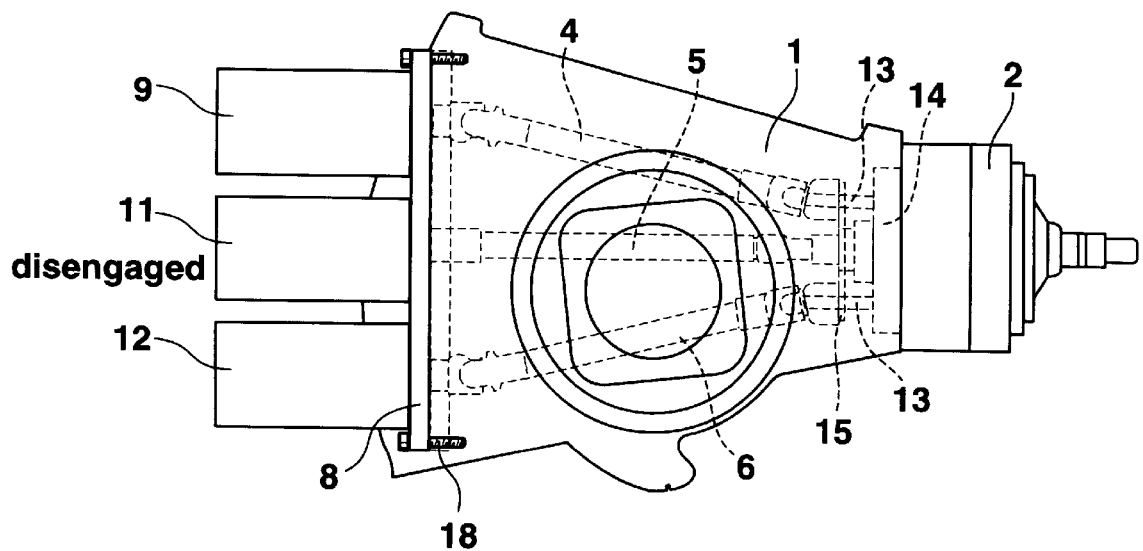
FIG. 3 shows a cut representation with the cardan shafts disengaged.
Figure 4:
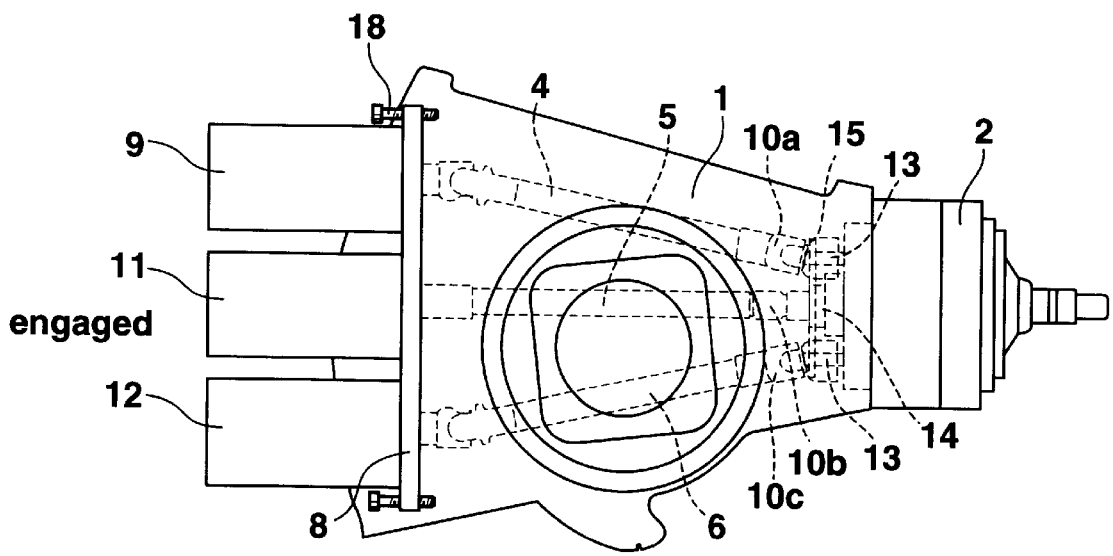
FIG. 4 shows a sectional representation with engaged cardan shafts.

In order to assemble the robot hand or its gear head 2, the bearing plate 8 is disengaged, i.e. pulled out along the guide pins 16, 17 away from the robot arm 1 through the engagement length of the shaft couplings 10a–10c to a sufficient extent that, when the gear head 2 is mounted, its coupling members 13, 14, 15 are no longer in engagement with the corresponding coupling members of the cardan shafts 4–6, as is shown in FIG. 3. The gear head 2 can then be attached to the robot arm 1. The bearing plate 8 is then coupled in, i.e. displaced along the guide pins 16, 17 towards the gear head 2, wherein the shaft couplings 10a–10c successively engage. The gear elements of the shaft head 2 can thereby each be turned by hand in such a fashion that further displacement of the bearing plate 8 and the associated displacement of the cardan shafts 4–6 effects engagement of all shaft couplings.

After the bearing plate 18 has been completely pushed in, it is mounted to the robot arm 1 using the bolts 18.

During the above mentioned procedure the motors 9, 11, 12 can be disposed on the bearing plate or could also be subsequently mounted thereon.

What is claimed is:

1. A robot arm device, the device comprising:
   a robot hand;
   a robot arm housing;
   a plurality of cardan shafts extending through said robot arm housing to drive said robot hand, said cardan shafts each having first ends proximate said robot hand and second ends distant from said robot hand;

a bearing plate bearing said cardan shafts at said second ends; and means for bearing said bearing plate on said robot arm housing for displacement relative thereto in an axial direction of said robot arm housing.

2. The device of claim 1, wherein said means for bearing said bearing plate comprise guide pins mounted to said robot arm housing.

3. The device of claim 1, further comprising bolt members for mounting said bearing plate to said robot arm housing in an operating position.

4. The device of claim 1, further comprising motors borne on said bearing plate for driving said cardan shafts.

* * * * *